United States Patent [19]

Szabo

[11]  4,354,962
[45]  Oct. 19, 1982

[54] METHOD FOR PREPARING A HYDROCARBON CONVERSION CATALYST

[75] Inventor: Georges Szabo, Le Havre, France

[73] Assignee: Compagnie Francaise de Raffinage, Paris, France

[21] Appl. No.: 222,378

[22] Filed: Jan. 5, 1981

Related U.S. Application Data

[63] Continuation of Ser. No. 45,623, Jun. 5, 1979, abandoned.

[30] Foreign Application Priority Data

Jun. 5, 1978 [FR] France ................................ 78 16755

[51] Int. Cl.$^3$ ...................... B01J 21/04; B01J 21/06; B01J 23/62; B01J 27/08
[52] U.S. Cl. .............................. 252/442; 252/431 C; 252/463; 252/466 PT
[58] Field of Search ................... 252/431 C, 442, 461, 252/463, 466 PT, 472; 106/57

[56]  References Cited

U.S. PATENT DOCUMENTS

| | | | |
|---|---|---|---|
| 2,444,913 | 7/1948 | Bond | 252/472 X |
| 3,642,933 | 2/1972 | Heckelsberg | 252/461 X |
| 3,974,097 | 8/1976 | Weisang et al. | 252/440 |
| 4,141,962 | 2/1979 | Dupuy et al. | 423/571 |

FOREIGN PATENT DOCUMENTS 2291791  6/1976  France .
2324361  4/1977  France .

*Primary Examiner*—W. J. Shine
*Attorney, Agent, or Firm*—Curtis, Morris & Safford

[57]  ABSTRACT

An improved method of depositing zirconium on a refractory oxide-mineral carrier.

Said method comprises contacting the refractory-oxide mineral carrier with a solution of a least one complex zirconium ion, the latter being formed by means of at least one organic acid and/or a salt of an organic acid.

Also carriers and catalysts prepared by said method.

12 Claims, No Drawings

METHOD FOR PREPARING A HYDROCARBON CONVERSION CATALYST

This is a continuation, of application Ser. No. 45,623, filed June 5, 1979, now abandoned.

The present invention relates to an improved method of depositing zirconium on a catalyst carrier which essentially consists of a refractory oxide mineral, generally alumina.

Zirconium forms part of the composition of many catalytic formulations used to transform or convert hydrocarbons or hydrocarbon fractions. For example, this metal is an active phase or promoter of catalysts (a) in the reforming, aromatization or isomerization of hydrocarbons, where it is used on a refractory oxide carrier along with at least one metal from the platinum group and at least one metal from group IVA of the Periodic Table; such catalytic formulations and their uses have been described by the applicant's assignee in its French patent No. 2,252,394 (see U.S. Pat. No. 3,974,097), and in its U.S. Pat. Nos. 4,116,910 and 4,152,246, for example; and (b) in the isomerization of hydrocarbons, and particularly of paraffinic hydrocarbons, where it is used on a refractory oxide carrier along with at least one metal from the platinum group and at least one metal halide, such catalytic formulations having been described by the Applicant's assignee in published French Pat. No. 2,320,775.

For the preparation of the zirconium catalysts described in said documents, a solution of a water-soluble salt of said metal may be used, preferably in an acid medium (hydrochloric acid, for example); the refractory oxide carrier, usually alumina in the form of extrudates or spherules, then being impregnated with said solution.

Said metal may also be incorporated in the catalytic mass in the form of its oxide (zirconia). Before the carrier (the refractory oxide) is impregnated with the active phases of the catalyst (platinum-group metal and promoter), mechanical mixing or coprecipitation of the alumina and the oxide in question is effected, followed by drying and calcination, which likewise results in a mixture of alumina and zirconium. By this method, the metal is distributed in the mass of the carrier. However, the results obtained in the hydrotreatment of hydrocarbons with such a catalytic preparation are not as good as those obtained when the catalyst is prepared by impregnation with a zirconium salt, as described in the documents cited above.

Pursuing his investigation of catalysts containing zirconium, the applicant has found that impregnation of the refractory oxide-mineral carrier with an aqueous solution of a soluble zirconium salt is not readily translated to the industrial scale.

The present invention thus seeks to improve the deposition of zirconium on a refractory oxide-mineral catalyst carrier.

The applicant has developed a method of depositing zirconium whereby uniform deposition of said metal and highly satisfactory utilization of the zirconium employed in such deposition are secured.

The present invention thus has as a preferred embodiment a method of depositing zirconium on a refractory oxide-mineral carrier; said method comprising contacting the refractory oxide-mineral carrier with a solution of at least one zirconium ion complex, the latter being formed from at least one organic acid and/or salt of an organic acid.

The invention has as a further preferred embodiment the zirconium-containing refractory oxide-mineral carrier obtained by said method of preparation, as well as the hydrocarbon conversion catalysts comprising the refractory oxide-mineral carrier and the zirconium prepared by said method.

Of the organic acids which may be used in accordance with the invention, either as an acid or as a salt of an acid, the following are preferably used: Oxalic acid, citric acid, and tartaric acid. Of these, oxalic acid is best suited for deposition of the zirconium on the refractory oxide mineral.

Suitable for use as refractory oxide-mineral carriers in accordance with the invention are the conventional supports for hydrocarbon conversion catalysts, namely, alumina, alumino-silicate, silica, silicoaluminate, etc.

The complex zirconium ions with oxalate ions may be formed by contacting in aqueous solution on the one hand a zirconium salt which dissociates to give the $Zr^{4+}$ or $ZrO^{++}$ ion in solution and, on the other hand, oxalic acid and/or an oxalate, such as the ammonium acid oxalate of formula $NH_4HC_2O_4$.

The following equilibria will occur in solution:

$$Zr^{4+} + C_2O_4^{2-} \rightleftharpoons ZrC_2O_4^{2+} \quad (1)$$

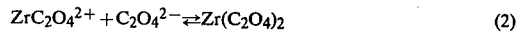
$$ZrC_2O_4^{2+} + C_2O_4^{2-} \rightleftharpoons Zr(C_2O_4)_2 \quad (2)$$

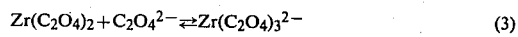
$$Zr(C_2O_4)_2 + C_2O_4^{2-} \rightleftharpoons Zr(C_2O_4)_3^{2-} \quad (3)$$

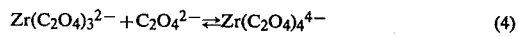
$$Zr(C_2O_4)_3^{2-} + C_2O_4^{2-} \rightleftharpoons Zr(C_2O_4)_4^{4-} \quad (4)$$

The transition from equilibrium (2), which gives rise to a precipitate, to the equilibria (3) and (4) takes place with an excess of oxalate ions in the solution.

The results obtained with this impregnating solution are very satisfactory, as will be seen in the examples which follow. This solution of complex ions thus serves for the impregnation of the refractory oxide-mineral carrier, alumina, for example.

The carriers which may be impregnated by this technique are conventional catalyst supports, that is to say, refractory materials having an adequate specific surface and pore volume, the specific surface being preferably comprised between 15 and 350 m$^2$/g, and the specific pore volume being greater than 0.1 cm$^3$/g. These materials may generally be acidic or slightly acidic, as alumina, for example. Aluminosilicates are also suited, as has been pointed out earlier. The carriers may be in the form of spherules, extrudates or other, more complex shapes (multiple lobes, for example).

The deposition of zirconium can be accomplished between the ambient temperature and the boiling temperature of the impregnating solution. In general, when one uses an aqueous solution, this boiling temperature is in the neighborhood of 100° C.

When the method is practiced at the boiling temperature of the solution, the deposition may be effected by means of a rotary evaporator, for example.

The carrier may be advantageously contacted with the complex ion solution at a temperature of less than 100° C.

The concentration of $ZrO^{++}$ and $Zr^{4+}$ ions in the depositing solution may reasonably be between M/10 and M/100.

Similarly, the ratio of the concentrations of the complexing ions (ions of the organic acids) to the concentrations of the metal ions in solution; that is to say, in the case of oxalic acid and zirconium, for example, the ratio $$[C_2O_4{}^{2-}]/[\text{Zr-containing ions}]$$

may reasonably be between 2 and 50.

After deposition, it will usually be necessary to dry the carrier containing the zirconium. Such drying should be carried out at between 100° and 300° C., and preferably between 100° and 150° C. It may be followed by calcination at between 400° and 700° C.

The various metals which are to form the active phases, or promoters, in the final catalytic formulation may then be deposited by known techniques on the carrier containing the zirconium. For example, the platinum-group metals may be deposited by conventional impregnation of an alumina to give a catalyst containing at least one platinum-group metal and zirconium on alumina.

A metal from group IVA such as tin (an aqueous solution of a tin chloride, for example) may also be deposited, in a manner which as such is known, followed by at least one metal from the platinum group, such as platinum, to give a catalytic formulation containing platinum, tin and zirconium on alumina. The tin and the platinum may be deposited in accordance with French Pat. No. 2,031,984, for example.

It will be understood that other metals, too, may be deposited, in a manner which as such is known, on the carrier containing zirconium.

The active-metal contents, based on the total weight of this conversion catalyst, are conventional. For the platinum-group metals, that content is comprised between 0.02 and 2%, and preferably between 0.10 and 0.70%, and for the zirconium, between 0.02 and 2%, and preferably between 0.02 and 1%. For the other metals, these contents may vary widely. The metals of group IVA (tin, germanium and lead), for example, should be present in a proportion of from 0.02 to 2%, and preferably from 0.05 to 1%.

The catalysts so prepared generally contain a halogen, preferably chlorine, the halogen content generally being under 10% and 0.1%, based on the total catalyst weight. For reforming, for example, the content of halogen-chlorine, for example—generally is comprised between 0.5 and 1.5%, and preferably is about 1%, while for isomerization the chlorine content of the catalyst is generally higher than for reforming, the halogen contents here contemplated generally ranging from about 1 to 10%. These halogen contents are conventional for the envisaged operations. The halogen may come from the impregnating solutions themselves or from the treatment of the catalyst with a halide, for example, a metal halide, or from both.

The examples which follow are intended to illustrate the invention and do not imply any limitation thereof.

EXAMPLE 1

This example describes the impregnation of alumina extrudates having the following characteristics:
Diameter—1.75 mm
Average length—3.7 mm
Pore volume—0.50 cm$^3$/g
Specific surface—185 m$^2$/g
Average pore radius—40 Å
by solutions of oxalic ions complexed by zirconium.

For such impregnation, 100 g of the extrudates were immersed in 250 ml of a solution containing zirconium chloride and an oxalate under the following conditions:
1.28 g of chloride, $ZrCl_4$ (0.022 mole/liter)
Ammonium acid oxalate, $NH_4HC_2O_4$ (ratio $[NH_4{}^+]/[C_2O_4{}^{2-}]$ fixed and equal to 1),
A variable molar ratio $[C_2O_4{}^{2-}]/[\text{Zr-containing ions}]$ The solution was circulated over the alumina bed for 5 hours. During that time, the pH of the solution slowly changed from 1 (initial solution) to 6.5.

The samples were dewatered, dried and calcined, following which they were examined with Castaing's microprobe to determine the distribution of the zirconium over the alumina. In addition, the amount of zirconium deposited was determined by x-ray fluorescence.

The results obtained are presented in Table 1 which follows.

TABLE 1

| Ratio Concentration in $C_2O_4{}^{2-}$ / Concentration in zirconium-containing ions | Zr deposited (wt. % of total of carrier + Zr) | Zr deposited Zr employed (%) | Notes |
| --- | --- | --- | --- |
| 2 | 0.38 | 69.1 | Tendency to precipitate Zr(OH)$_4$ |
| 6 | 0.55 | 100 | Peripheral deposition |
| 12 | 0.55 | 100 | Peripheral deposition |
| 15 | 0.50 | 91 | Quasi-uniform distribution |
| 20 | 0.43 | 78.2 | Uniform distribution |
| 20 | 0.48 | 87.3 | Uniform distribution |
| 25 | 0.39 | 70.9 | Uniform distribution |
| 30 | 0.33 | 60 | Uniform distribution |
| 36 | 0.32 | 58.2 | Uniform distribution |

It is apparent from that table that when the ratio of concentration of $C_2O_4{}^{2-}$ to concentration of zirconium-containing ions is less than 15, the zirconium deposits rapidly and mainly on the periphery of the extrudates. When that ratio exceeds 20, deposition proceeds more slowly but the distribution is uniform, with the zirconium penetrating into the interior of the extrudates.

The amounts employed depend, of course, on the zirconium content which the final catalyst is to have. Thus a content of 0.20% by weight can be obtained with 250 ml of an impregnating solution containing 1 g of zirconium in the form of a soluble salt, 0.0822 mole of oxalic acid, and 0.0822 mole of ammonium oxalate for 500 g of alumina.

EXAMPLE 2

This example relates to the utilization of alumina carriers containing zirconium which has been incorporated in the alumina by the method in accordance with the invention in the preparation of hydrocarbon conversion catalysts containing platinum and tin.

Presented in Table 2 below are the principal steps in the preparation of the catalyst. The carrier material is the alumina of Example 1, the amount treated being 500 grams.

TABLE 2

| STEP | SOLUTION USED | | |
|---|---|---|---|
| | Composition | Volume | Circulating Time |
| Deposition of zirconium | 0.25 mole $H_2C_2O_4$ 0.134 mole $(NH_4)_2 C_2O_4$ 1 g Zr (nitrate, chloride or oxychloride) | 2,500 $cm^3$ | 4 hr. |
| Drying (4 hr. at 120° C.) | | | |
| Calcination (2 hr. at 600° C.) | | | |
| Acidification | 0.42 mole HCl 0.48 mole $HNO_3$ | 1,2500 $cm^3$ | ½ hr. |
| Deposition of tin* | Preceding solution + 100 $cm^3$ of an $Sn^{++}$ solution containing 1.9 g of $SnCl_2$ and 0.6 mole of HCl | 1,350 $cm^3$ | 2 hr. |
| Deposition of platinum | 1.77 g Pt ($H_2PtCl_6$) 0.03 mole HCl | 580 $cm^3$ | 4 hr. |

*After this deposition, the solid is washed with water for adjustment of the chlorine content and may then be subjected to the treatments (drying and calcination) described in French patent 2,031,984.

After the deposition of the platinum, the catalyst was dried at about 120° C., then calcined at 530° C.
The catalyst had the following formula:
Pt—0.36 wt. %
Sn—0.21 wt. %
Zr—0.14 wt. %
Cl—1.68 wt. %

This catalyst was used to isomerize a hydrocarbon charge having the following composition:
Ethylbenzene (EB)—25.51 wt. %
Toluene—1.26 wt. %
Metaxylene (MX)—70.93 wt. %
Orthoxylene (OX)—0.72 wt. %
Paraxylene (PX)—1.26 wt. % under the following conditions:
Temperature entering reactor: 470° C.
Hourly space velocity (measured in the liquid state): 2
Total pressure: 22 bars
Hydrogen-to-hydrocarbon ratio: 5
The results are presented in Table 3 which follows.

TABLE 3

| | Yield by weight at the end of: | |
|---|---|---|
| | 25 hr. | 28 hr. |
| Light hydrocarbons (<C7) | 4.73 | 5.34 |
| Benzene | 1.62 | 1.61 |
| Toluene | 3.0 | 2.87 |
| Saturated with 8C atoms | 6.12 | 5.82 |
| EB | 10.50 | 10.46 |
| PX | 17.75 | 17.56 |
| MX | 39.05 | 38.61 |
| OX | 16.87 | 16.46 |
| Heavy hydrocarbons (>C9) | 1.72 | 1.27 |
| C8 aromatics | 84.17 | 83.1 |
| EB conversion | 59.3 | 59.5 |
| $R = \frac{PX + OX}{PX + OX + Losses}$ | 0.686 | 0.668 |

These results show that Pt-Sn-Zr/$Al_2O_3$ catalysts prepared in accordance with the invention so far as the zirconium deposit is concerned are good isomerization catalysts for alkylaromatic hydrocarbons.

EXAMPLE 3

This example relates to the utilization of alumina carriers containing zirconium which has been incorporated in the alumina in accordance with Example 2 in the preparation of hydrocarbon reforming catalysts.

The applicant has tested four catalytic formulations prepared in accordance with Example 1 whose compositions are as follows:

TABLE 4

| | | Catalyst | | | |
|---|---|---|---|---|---|
| | | T1 | A | B | T2 |
| Platinum | wt. % | 0.34 | 0.36 | 0.37 | 0.36 |
| Tin | wt. % | 0.20 | 0.21 | 0.20 | 0.20 |
| Zirconium | wt. % | 0 | 0.21 | 0.94 | 0.18* |
| Chlorine | wt. % | 0.88 | 0.84 | 0.91 | 1.28 |

*Deposited by means of a zirconyl nitrate solution, as described in French patent 2,252,394.

These four formulations were tested in the following manner: 25 $cm^3$ of catalyst was placed in a stainless-steel reactor, and a stream of pure, dry hydrogen was passed over the catalyst for 2 hours, the catalyst temperature being maintained at about 500° C., and the pressure in the reactor being maintained at 7 bars. Then the temperature was raised to about 510° C. and the charge consisting of normal heptane was introduced at an hourly space velocity (liquid) of 2 and a molar ratio of hydrogen to n-heptane of 5.

The samples taken from the reactor effluent permit the determination of the liquid yield, simply by weighing, and of the equivalent octane number of the liquid by application to the chromatographic analyses of the liquid of the ASTM blend numbers given in the nomographs.

The tests are conducted at a fixed clear octane number, that is to say, as soon as a decrease in octane number is observed, the reactor temperature is raised in order to bring the octane number to the level originally selected. The variation of the temperature T as a function of time t (curve T = f(t)) closely resembles a straight line whose gradient is measured. The milder the gradient of the straight line, the better the catalyst, as the temperature then needs to be adjusted only very slightly in the course of time to secure the octane number fixed at the start. It then takes longer to reach the temperature limit for use, and the duration of the cycle of use is extended, which is a considerable advantage in industrial applications.

The results of the tests so run for a clear octane number of 103 are presented in Table 5 below for the four formulations tested.

TABLE 5

| Catalyst | Initial Temperature | Temperature gradient as a function of time | Average liquid yield |
|---|---|---|---|
| T1 | 509 | 0.061 | 59.4 |
| T2 | 507 | 0.058 | 59.9 |
| A | 513 | 0.028 | 59.9 |
| B | 516 | 0.048 | 60.7 |

In the light of these results, the following conclusions may be drawn:
(1) The four formulations are very good reforming catalysts.

(2) The presence of zirconium increases the stability of the catalyst. (Temperature gradient as a function of time less for T2 than for T1). This advantage is enhanced when the zirconium is deposited in accordance with the method of the invention. (Compare A and B with T2).

It should be noted that the spread between the initial temperatures is not significant. The main criterion for rating these formulations is the temperature gradient as a function of time.

EXAMPLE 4

This example illustrates the utilization of alumina carriers containing zirconium which has been incorporated in the alumina in accordance with the method described in Example 2 in the preparation of hydrocarbon isomerization catalysts.

The catalyst tested contained:
0.35 wt. % platinum
0.66 wt. % zirconium
5.04 wt. % chlorine The platinum and the chlorine were deposited on the catalyst by the method described in published French patent 2,320,775 (hexachloroplatinic acid solution; subsequent treatment with aluminum halide).

25 cm$^3$ of this catalyst were placed in a paraffin isomerization reactor, the reaction conditions being as follows:
Total pressure—30 bars
Hydrogen-to-hydrocarbon ratio—3
Hourly space velocity—5

The hydrocarbon charge had the following composition:
Isopentane—1.26 %
Normal pentane—48.99%
2,2-Dimethylbutane—0.11%
2-Methylpentane—5.84%
3-Methylpentane—4.74%
Normal hexane—36.17%
Methylcyclopentane—2.08%
Benzene—0.06%
Cyclohexane—0.75%

The isomerate obtained had an octane number of 83. The ratio of 2,2-dimethylbutane to total hydrocarbons with 6 carbon atoms was 0.268, and the ratio of isopentane to total hydrocarbons with 5 carbon atoms was 0.72.

These results reflect the very good performance of this type of catalyst in the isomerization of paraffins.

I claim:

1. In a method for the preparation of a hydrocarbon conversion catalyst comprising zirconium deposited on a refractory oxide mineral carrier comprised of alumina, the improvement in said method comprising impregnating said carrier with a solution of at least one complex zirconium ion, the latter having been formed by means of at least one organic acid selected from the group consisting of oxalic acid and/or its salt, the impregnating zirconium solution having a ratio of concentration of oxalic acid ions to the concentration of zirconium-containing ions of at least fifteen, the zirconium ion concentration of the solution being between M/10 and M/100, then drying the zirconium-impregnated solid between 100° and 300° C. and thereafter calcining said solid at between 400° and 700° C.

2. A method according to claim 1, wherein said ratio of concentration of oxalic acid ions is lower than fifty.

3. A method according to claim 1, wherein said ratio of concentration of oxalic acid ions is between about twenty and about thirty six.

4. A method according to claim 1, wherein the organic acid is essentially only oxalic acid and/or its salt.

5. A method according to claim 2, wherein said drying is between 100° and 150° C.

6. A method according to claim 2, wherein the carrier is contacted with the solution of complex ions at a temperature ranging from ambient temperature to the boiling temperature of the solution.

7. A method according to claim 2, wherein said carrier is contacted with the complex ion solution at a temperature of less than 100° C.

8. A method according to claim 3, wherein said catalyst comprises said carrier having a halogen ingredient content of between 10% and 0.1%, from 0.02% to 2% of at least one platinum group metal ingredient; from 0.02% to 2% of at least one metal ingredient of group IV A, and from 0.10% to 0.70% of a zirconium ingredient, with said percentages being based on the total catalyst weight.

9. A method according to claim 5, wherein the carrier is contacted with the solution of complex ions at a temperature ranging from ambient temperature to the boiling temperature of the solution.

10. A method according to one of claims 3, 4 or 9 and wherein the active phases and/or promoters are deposited on said carrier by impregnation, and further wherein said active phase contains at least one metal from the platinum group.

11. A method according to claim 10 wherein said promoters contain at least one metal from group IVA.

12. A method according to claim 10 wherein said active phase is only platinum and said promoter is only tin.

* * * * *

UNITED STATES PATENT AND TRADEMARK OFFICE
CERTIFICATE OF CORRECTION

PATENT NO. : 4,354,962
DATED : Oct. 19, 1982
INVENTOR(S) : Georges Szabo

It is certified that error appears in the above—identified patent and that said Letters Patent is hereby corrected as shown below:

Column 8, line 42 (Claim 10, line 1) after "claims" insert --1,--.

Signed and Sealed this

Eighteenth Day of January 1983

[SEAL]

Attest:

GERALD J. MOSSINGHOFF

Attesting Officer

Commissioner of Patents and Trademarks